United States Patent
Jacob Da Silva et al.

(10) Patent No.: US 11,425,014 B2
(45) Date of Patent: Aug. 23, 2022

(54) SCALABLE IN-BAND TELEMETRY METADATA EXTRACTION

(71) Applicant: LENOVO Enterprise Solutions (Singapore) PTE. LTD., New Tech Park (SG)

(72) Inventors: Roberto Jacob Da Silva, Oak Park, CA (US); Corneliu-Ilie Calciu, Bucharest (RO); Radu Iorga, Bucharest (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 261 days.

(21) Appl. No.: 16/836,459

(22) Filed: Mar. 31, 2020

(65) Prior Publication Data

US 2021/0306246 A1 Sep. 30, 2021

(51) Int. Cl.
*H04L 43/0894* (2022.01)
*H04L 41/0816* (2022.01)
*H04L 43/0852* (2022.01)

(52) U.S. Cl.
CPC ...... *H04L 43/0894* (2013.01); *H04L 41/0816* (2013.01); *H04L 43/0858* (2013.01)

(58) Field of Classification Search
CPC ..... H04L 41/0816; H04L 41/34; H04L 43/08; H04L 43/0858; H04L 43/0894; H04L 43/16
See application file for complete search history.

(56) References Cited

U.S. PATENT DOCUMENTS

| 2020/0186465 | A1* | 6/2020 | Dontula Venkata | .... H04L 49/25 |
| 2020/0412633 | A1* | 12/2020 | Song | ........................ H04L 41/12 |
| 2021/0218647 | A1* | 7/2021 | Rangarajan | ............. H04L 43/06 |

OTHER PUBLICATIONS

Netronome, "Barefoot Networks and Netronome Demonstrate End-to-End In-Band Network Telemetry for 5G NFV Deployments", Feb. 27, 2017, pp. 1-7.
Broadcom, BroadView-SP102, "Instrumentation Agent", Nov. 15, 2018, pp. 1-160.
Tai Mizrahi, et al., Marvell, "Network Telemetry Solutions for Data Center and Enterprise Networks", Mar. 2018, pp. 1-14.

* cited by examiner

*Primary Examiner* — Gil H. Lee
(74) *Attorney, Agent, or Firm* — Kunzler Bean & Adamson; Bruce R. Needham

(57) ABSTRACT

An apparatus includes a controller adds telemetry data to a telemetry packet transmitted along a communication pathway for data packets being transmitted from a sending host to a receiving host. The controller determines, from the telemetry packet, a number of network nodes in the communication pathway that have added telemetry data to the telemetry packet. The controller transmits the telemetry packet to a next destination along the communication pathway and to a network controller in response to determining that the number of network nodes in the communication pathway that have added telemetry data to the telemetry packet is equal to or greater than a network node threshold. The controller just transmits the telemetry packet to the next destination in response to determining that the number of network nodes in the communication pathway that have added telemetry data to the telemetry packet is less than the network node threshold.

20 Claims, 8 Drawing Sheets

SCALABLE IN-BAND TELEMETRY METADATA EXTRACTION

FIELD

The subject matter disclosed herein relates to transmitting telemetry packets and more particularly relates to telemetry packets monitoring data flow of data packets being transmitted through network nodes between a sending host to a receiving host and reducing the amount of telemetry packets sent from the network nodes to a network controller.

BACKGROUND

In-band telemetry in a computer network monitors flow of data packets between a sending host and a receiving host through network nodes forming a communication pathway. Typically, in-band telemetry is monitored by inserting or generating telemetry packets at an ingress node connected to the sending server and transmitting the telemetry packet along the data flow of the communication pathway. Each network node along the communication pathway adds telemetry data to the telemetry packet and, in some cases, each of the network nodes in the communication pathway sends the telemetry packet to a network controller. This is inefficient because a telemetry packet at the egress node connected to the receiving host includes the telemetry data from each network node upstream of the egress node and telemetry packets sent from network nodes upstream of the egress node are unnecessary and unwanted network traffic.

BRIEF SUMMARY

An apparatus for reducing transmission of telemetry packets includes a network node with a controller. The controller is configured to add telemetry data to a telemetry packet. The telemetry packet is being transmitted along a communication pathway for data packets being transmitted from a sending host to a receiving host. The controller is configured to determine, from the telemetry packet, a number of network nodes in the communication pathway that have added telemetry data to the telemetry packet. The controller is configured to transmit the telemetry packet to a next destination along the communication pathway and to a network controller in response to determining that the number of network nodes in the communication pathway that have added telemetry data to the telemetry packet is equal to or greater than a network node threshold. The controller is also configured to transmit the telemetry packet to the next destination along the communication pathway without transmitting the telemetry packet to the network controller in response to determining that the number of network nodes in the communication pathway that have added telemetry data to the telemetry packet is less than the network node threshold.

A method for reducing transmission of telemetry packets includes receiving, at a network controller, telemetry packets from network nodes in a communication pathway of data packets being transmitted from a sending host to a receiving host and determining from the telemetry packets a number of network nodes in the communication pathway. The method includes setting a network node threshold value equal to the determined number of network nodes in the communication pathway, and transmitting, from the network controller, the network node threshold value to each network node in the communication pathway.

A program product for reducing transmission of telemetry packets includes a computer readable storage medium with program code. The program code is configured to be executable by a processor to perform operations that include receiving, at a network controller, telemetry packets from network nodes in a communication pathway of data packets being transmitted from a sending host to a receiving host, determining from the telemetry packets a number of network nodes in the communication pathway, setting a network node threshold value equal to the determined number of network nodes in the communication pathway, and transmitting, from the network controller, the network node threshold value to each network node in the communication pathway.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
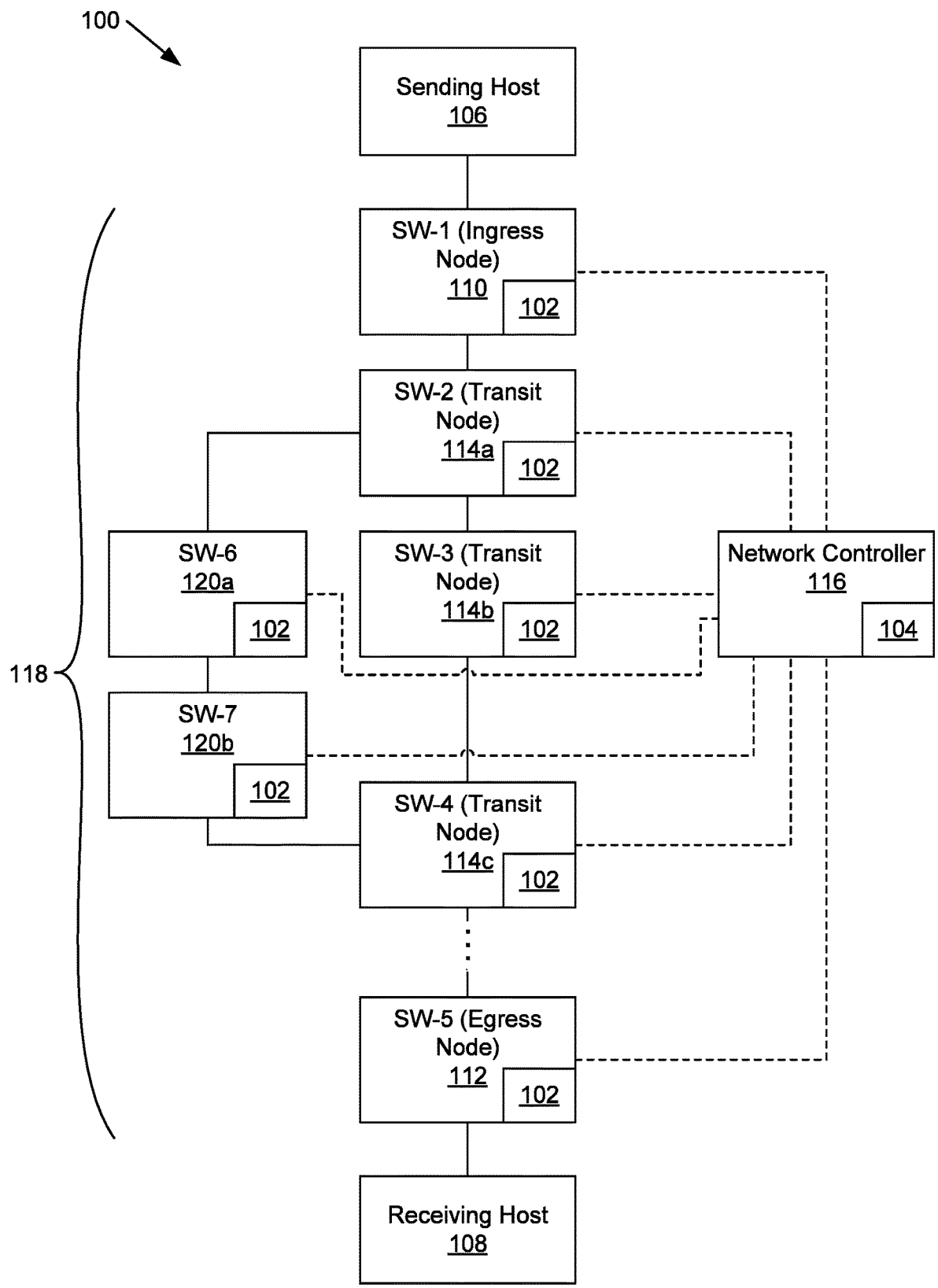
FIG. 1 is a schematic block diagram illustrating one embodiment of a data network with network nodes connecting a sending host and a receiving host where the network nodes are connected to a network controller and the network nodes each include a telemetry apparatus.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as program code. The storage devices may be tangible, non-transitory, and/or non-transmission. The storage devices may not embody signals. In a certain embodiment, the storage devices only employ signals for accessing program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays ("FPGAs"), programmable array logic, programmable logic devices or the like.

Modules may also be implemented in program code for execution by various types of processors. An identified module of program code may, for instance, comprise one or more physical or logical blocks of program code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing program code. The storage device may be, for example, but not limited to, an electronic, magnetic, optical, electromagnetic, infrared, holographic, micromechanical, or semiconductor system, apparatus, or device, or any suitable combination of the foregoing, and excluding transitory signals.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by program code. This program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of program code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for reducing transmission of telemetry packets includes a network node with a controller. The controller is configured to add telemetry data to a telemetry packet. The telemetry packet is being transmitted along a communication pathway for data packets being transmitted from a sending host to a receiving host. The controller is configured to determine, from the telemetry packet, a number of network nodes in the communication pathway that have added telemetry data to the telemetry packet. The controller is configured to transmit the telemetry packet to a next destination along the communication pathway and to a network controller in response to determining that the number of network nodes in the communication pathway that have added telemetry data to the telemetry packet is equal to or greater than a network node threshold. The controller is also configured to transmit the telemetry packet to the next destination along the communication pathway without transmitting the telemetry packet to the network controller in response to determining that the number of network nodes in the communication pathway that have added telemetry data to the telemetry packet is less than the network node threshold.

In some embodiments, the controller is further configured to reset the network node threshold to a default value in response to receiving a reset command from the network controller. In further embodiments, the default value of the network node threshold is a value that causes each network node in the communication pathway to transmit the telemetry packet to the network controller in addition to transmitting the telemetry packet to the next destination along the communication pathway. In further embodiments, the default value of the network node threshold is one or less. In other embodiments, the controller is configured to set the network node threshold to a value equal to a number of network nodes in the communication pathway in response to receiving a set threshold command from the network node. The set threshold command includes the number of network nodes in the communication pathway.

In some embodiments, the controller is further configured to, in response to receiving a telemetry setup command from the network controller, establish the network node threshold for telemetry packets being transmitted along the communication pathway and to set the network node threshold to a default value. The default value of the network node threshold is a value that causes each network node to transmit the telemetry packet to the network controller in addition to transmitting the telemetry packet to the next destination along the communication pathway. In other embodiments, the communication pathway includes network nodes that transmit data packets and telemetry packets on a data link layer. In other embodiments, the communication pathway includes network nodes in a same network. In other embodiments, the telemetry data includes latency data of data packets being processed by the network node. In other embodiments, the controller is configured to determine the next destination along the communication pathway based on destination Media Access Control ("MAC") lookup.

A method for reducing transmission of telemetry packets includes receiving, at a network controller, telemetry packets from network nodes in a communication pathway of data packets being transmitted from a sending host to a receiving host and determining from the telemetry packets a number of network nodes in the communication pathway. The method includes setting a network node threshold value equal to the determined number of network nodes in the communication pathway, and transmitting, from the network controller, the network node threshold value to each network node in the communication pathway.

In some embodiments, the method includes receiving, at the network controller, one or more additional telemetry packets in response to transmitting the network node threshold value to the network nodes in the communication pathway, determining from a received telemetry packet that the number of network nodes in the communication pathway is greater than the transmitted network node threshold value, updating the network node threshold value to a new number of network nodes in the communication pathway, and transmitting, from the network controller, the updated network node threshold value to each network node in the communication pathway.

In other embodiments, the method includes, in response to transmitting the network node threshold value to the network nodes in the communication pathway, reaching a telemetry packet time limit from a time that a previous telemetry packet was received by the network controller. In the embodiment, in response to reaching the telemetry packet time limit the method includes transmitting, from the network controller, a network node threshold value that includes a default value to each network node in the communication pathway. The default value is a value that causes each network node to transmit telemetry packets being transmitted along the communication pathway to the network controller in addition to transmitting the telemetry packets to a next destination along the communication pathway. In other embodiments, the method includes determining a telemetry packet rate. The telemetry packet rate includes an average time between receiving, at the network controller, telemetry packets for the communication pathway, and setting the telemetry packet time limit, the telemetry packet time limit comprising the average time between receiving telemetry packets in addition to an acceptable delay time.

In some embodiments, telemetry packets and data packets transmitted from the sending host to the receiving host are transmitted on a data link layer. In other embodiments, the method includes transmitting a telemetry setup command to each network node in a network. The telemetry setup command includes identifying information for the sending host and the receiving host. Each network node in the communication pathway, in response to receiving the telemetry setup command, sets a network node threshold to a default value, adds telemetry data to a telemetry packet, transmits the telemetry packet to a next destination in the communication pathway and transmits the telemetry packet to the network controller.

A program product for reducing transmission of telemetry packets includes a computer readable storage medium with program code. The program code is configured to be executable by a processor to perform operations that include receiving, at a network controller, telemetry packets from network nodes in a communication pathway of data packets being transmitted from a sending host to a receiving host, determining from the telemetry packets a number of network nodes in the communication pathway, setting a network node threshold value equal to the determined number of network nodes in the communication pathway, and transmitting, from the network controller, the network node threshold value to each network node in the communication pathway.

In some embodiments, the program code is further configured to be executable by a processor to perform operations that include receiving, at the network controller, one or more additional telemetry packets in response to transmitting the network node threshold value to the network nodes in the communication pathway, determining from a received telemetry packet that the number of network nodes in the communication pathway is greater than the transmitted network node threshold value, updating the network node threshold value to a new number of network nodes in the communication pathway, and transmitting, from the network controller, the updated network node threshold value to each network node in the communication pathway. In other embodiments, the program code is further configured to be executable by a processor to perform operations including, in response to transmitting the network node threshold value to the network nodes in the communication pathway, reaching a telemetry packet time limit from a time that a previous telemetry packet was received by the network controller, and transmitting, from the network controller, a network node threshold value that includes a default value to each network node in the communication pathway. The default value includes a value that causes each network node to transmit telemetry packets being transmitted along the communication pathway to the network controller in addition to transmitting the telemetry packets to a next destination along the communication pathway.

In other embodiments, the program code is further configured to be executable by a processor to perform operations that include transmitting a telemetry setup command to each network node in a network, where the telemetry setup command includes identifying information for the sending host and the receiving host. Each network node in the communication pathway, in response to receiving the telemetry setup command sets a network node threshold to a default value, adds telemetry data to a telemetry packet, transmits the telemetry packet to a next destination in the communication pathway, and transmits the telemetry packet to the network controller.

FIG. 1 is a schematic block diagram illustrating one embodiment of a data network 100 with network nodes 118, which include a first switch (SW-1) which is an ingress node 110, a fifth switch (SW-5) which is an egress node 112, switches SW-2, SW-3, and SW-4 which are transit nodes 114*a-c* (generically or collectively "114"), and switches SW-6 120*a* and SW-7 120*b* (generically or collectively "120") connecting a sending host 106 and a receiving host 108 where the network nodes 118 are connected to a network controller 116 and the network nodes 118 each include a telemetry apparatus 102. The network controller 116 includes a telemetry analysis apparatus 104. The data network 100 is described in detail below.

The data network 100 includes a sending host 106 and a receiving host 108, which are computing devices connected to network nodes 118 of the data network 100. The computing devices may be a host, a rack-mounted server, a workstation, a portable electronic device, etc. For example, the data network 100 may be in a data center, may be part of a computer network of a company, or other data network where a network controller communicates with each network node 118. In the embodiments described herein, in-band refers to data flows, telemetry information, etc. that are controlled by the network controller 116 rather than external networks administered by various parties. For example, the sending host 106 and/or receiving host 108 may be part of multi-tenant servers with virtual machines each accessed by a client. In some embodiments, the sending host 106 and the receiving host 108 are computing devices configured for user access with a direct data connection to the ingress node 110 or egress node 112. In some embodiments, the data network 100 includes a connection to one or more external networks, such as the Internet, a wide-area-network, a cellular network, and the like.

The network nodes 118, are data transmission devices that facilitate receiving and transmitting data packets from the sending host 106 to the receiving host 108. A network node 118 may be a switch, a router or other data transport device. In some embodiments, the network nodes 118 are layer-2 devices where layer-2 is the second layer in the Open Systems Interconnection ("OSI") Model. In some embodiments, the second layer of the OSI model is a data link layer and the network nodes 118 are all within a same network. In other embodiments, the switches SW-1 to SW-7 are switches, routers or other devices with layer-2 capabilities. While seven switches SW-1 to SW-7 are depicted in FIG. 1, the data network 100 may include more switches or less switches. The network nodes 118 typically include a discovery mechanism that discovers connected network nodes 118 and other devices, such as the sending host 106 and receiving host 108 where information about the connected devices 106, 108, 118 are stored in a routing table or Media Access Control ("MAC") address lookup table. The routing table is some type of data structure, such as a register, a database, etc. Typically, the routing table includes whether or not a particular device, such as the sending host 106 or receiving host 108 are directly connected to a network node 118.

The routing table may also include a particular egress port of a network node 118 that connects to a downstream network node 118. For example, switch SW-2 114a may be connected to switch SW-3 114b on egress port A and to switch SW-6 120a on egress port B. The routing table, in some embodiments, includes which egress port of a network node 118 connects to a downstream network node 118. Typically, each network node 118 includes more than one egress port. For example, a network node 118 may include 128 egress ports. Typically, each network node 118 includes a plurality of ingress ports, which may also be listed in the routing table. In other embodiments, each network node 118 includes a table or other data structure that stores information about which downstream network node 118 is connected to each egress port and which upstream network node 118 is connected to each ingress port and an external routing table keeps track of network node connections without port information.

In some embodiments, a telemetry routing process used by the apparatuses 200, 300, 400, 500 described below registers with the network nodes 118. As the data network 100 changes, data paths change which may affect routing from a sending host 106 to a receiving host 108, which affects telemetry routing.

The network nodes 118 are connected to a network controller 116. In some embodiments, the network nodes 118 are connected to the network controller 116 over a back channel which is not part of data flow between the sending host 106 and the receiving host 108. In one embodiment, the network controller 116 communicates with the network nodes 118 over network connections that carry data. In other embodiments, the network controller 116 communicates with the network nodes 118 over a side-band or out-of-band connection that is not part of data flow. In some embodiments, the network controller 116 is connected directly to each network node 118. In other embodiments, the network controller 116 is connected indirectly to at least some network nodes 118. One of skill in the art will recognize other ways to connect the network controller 116 to the network nodes 118 and other ways to for the network controller 116 to manage the network nodes 118.

Network connections between the sending host 106 and ingress node 110, the receiving host 108 and egress node 112 and between network nodes 118 may be wired, wireless, fiber connections, and the like. The network connections are within a same network. The network typically includes a connection to one or more external networks through a router or similar device. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

As depicted in FIG. 1, each network node 118 includes a telemetry apparatus 102. The telemetry apparatus 102 is described in more detail with regards to FIGS. 2 and 3. The network controller 116 includes a telemetry analysis apparatus 104, which is described with regard to FIGS. 4 and 5.

The data network 100 depicts only two hosts and a few network nodes 118, however, the data networks 100 is representative of other data networks with more hosts and other devices connected to network nodes as well as data networks with more network nodes in other configurations.

The network nodes 118 are depicted with multiple data paths from the sending host 106 to the receiving host 108. Additional parallel data paths may also exist from the sending host 106 to the receiving host 108. Often, a preferred data path exists from a sending host 106 to a receiving host 108, but other data paths may be used, for example, if the preferred pathway is unavailable, is slow, etc.

Figure 2:
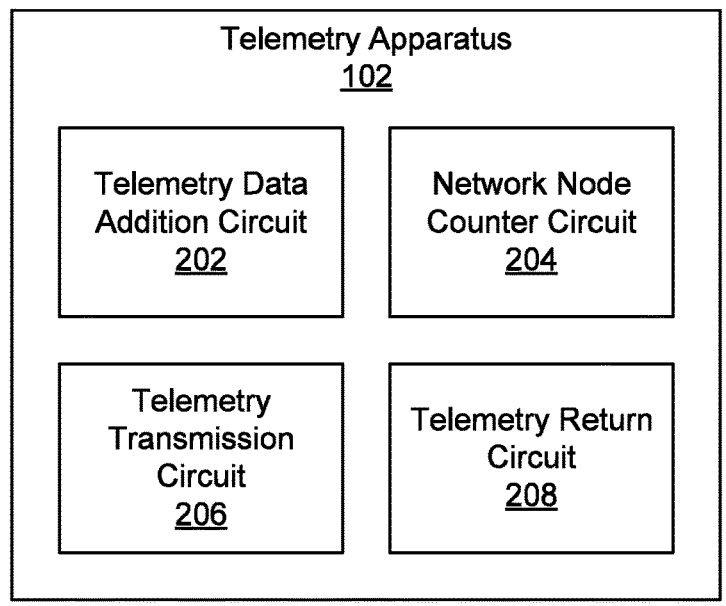
FIG. 2 is a schematic block diagram illustrating one embodiment of a telemetry apparatus for reducing unnecessary telemetry packet transmission to a network controller.

FIG. 2 is a schematic block diagram illustrating one embodiment 200 of a telemetry apparatus 102 for reducing unnecessary telemetry packet transmission to a network controller 116. In the embodiment, the telemetry apparatus 102 includes a controller in a network node 118 where the controller includes a telemetry data addition circuit 202, a network node counter circuit 204, a telemetry transmission circuit 206 and a telemetry return circuit 208, which are described in more detail below. In some embodiments, the telemetry apparatus 102 is embodied with hardware circuits. For example, hardware circuits may be used to implement the telemetry apparatus 102 so that telemetry packets are processed and sent on a same time scale as data packets in a communication pathway between the sending host 106 and the receiving host 108 are processed. In other embodiments, all or a portion of the telemetry apparatus 102 is implemented using a programmable hardware device, such as an FPGA, programmable array logic, etc. In other embodiments, a portion or all of the telemetry apparatus 102 is implemented in program code and executed on a processor of the network node 118.

The telemetry apparatus 102 includes a telemetry data addition circuit 202 that adds telemetry data to a telemetry packet. The telemetry packet is being transmitted along the communication pathway, which is the same communication pathway being used to transmit data packets the sending host 106 to the receiving host 108. Where the network node 118 is a transit node 114 or the egress node 112, the network node 118 receives a telemetry packet and the telemetry data addition circuit 202 adds telemetry data to the received telemetry packet. The telemetry data includes latency information regarding data packets being processed by the network node 118 that are being transmitted along the communication pathway. The latency information may include latency information for a data queue of an ingress port that receives data packets, latency information for a data queue in an egress port that transmits data packets, internal processing time of the data packets by the network node 118, etc.

Where the network node 118 is an ingress node 110, in some embodiments the ingress node 110 receives a telemetry packet from the sending host 106 or from the network controller 116. In other embodiments where the network node 118 is the ingress node 110, the ingress node 110 generates the telemetry packet, for example from a data packet, and the telemetry data addition circuit 202 adds telemetry data to the received telemetry packet.

The telemetry data addition circuit 202 adds telemetry data to the header of the telemetry packet. For example, when the telemetry packet is generated, the telemetry packet header includes an indicator that the telemetry packet is not a data packet and includes identifiers for the sending host 106 and the receiving host 108. For example, the telemetry packet may include a MAC address or some other address that uniquely identifies the sending host 106 and the receiving host 108. In some embodiments, the telemetry data addition circuit 202 adds telemetry data of the network node 118 to a next position in the header of the telemetry packet. In some embodiments, the telemetry data addition circuit 202 adds an identifier of the network node 118, which may be used by the network controller 116 in identifying the communication pathway.

The telemetry apparatus 102 includes a network node counter circuit 204 that determines, from the telemetry packet, a number of network nodes 118 in the communication pathway that have added telemetry data to the telemetry packet. For example, where the network node 118 is a transit node SW-3 114b, the ingress node 110, the transit node SW-2 114a and the transit node SW-3 114b each have a telemetry data addition circuit 202 that adds telemetry data to the telemetry packet so that the network node counter circuit 204 determines that at that point there are three network nodes 118 in the communication pathway. A network node counter circuit 204 in transit node SW-4 114c would determine that there are four network nodes 118 in the communication pathway, each with a telemetry data addition circuit 202 that added telemetry data.

In some embodiments, the network node counter circuit 204 examines the header of the telemetry packet and reads metadata in the telemetry packet header to determine how many network nodes 118 have contributed to the telemetry data in the telemetry packet. In some embodiments, the telemetry data addition circuit 202 of each network node 118 adds certain data in a particular format to a header of a telemetry packet. For example, the added telemetry data may be in a data structure or may be of a certain length and the network node counter circuit 204 determines how many network nodes 118 contributed to the telemetry packet from the length of the telemetry data or by how many telemetry data records are in the header of the telemetry packet. In other embodiments, each time that the telemetry data addition circuit 202 of a network node 118 adds telemetry data to a header of a telemetry packet, the telemetry data addition circuit 202 increases a counter in the header of the telemetry packet and the network node counter circuit 204 determines how many network nodes 118 have contributed to the telemetry packet by reading the counter. One of skill in the art will recognize other ways for the network node counter circuit 204 to determine, from the telemetry packet, the number of network nodes 118 that have added telemetry data to the telemetry packet.

The telemetry apparatus 102 includes a telemetry transmission circuit 206 that transmits the telemetry packet to a next destination along the communication pathway. The next destination may be a transit node 114, an egress node 112 or the receiving host 108 and the telemetry transmission circuit 206 transmits the telemetry packet to the next destination after the telemetry data addition circuit 202 adds telemetry data to the telemetry packet. Where the network node 118 is an egress node 112, the telemetry transmission circuit 206 does not transmit the telemetry packet to the receiving host 108.

The telemetry apparatus 102 includes a telemetry return circuit 208 that transmits the telemetry packet to the network controller 116 in response to determining that the number of network nodes 118 in the communication pathway that have added telemetry data to the telemetry packet is equal to or greater than a network node threshold. If the telemetry return circuit 208 determines that the number of network nodes 118 in the communication pathway that have added telemetry data to the telemetry packet is less than a network node threshold, the telemetry return circuit 208 does not transmit the telemetry packet to the network controller 116.

For example, if there are six network nodes 118 in the communication pathway and the network node threshold is set to six, then the telemetry return circuit 208 in the first five network nodes 118 in the communication pathway and the telemetry return circuit 208 would return the telemetry packet to the network controller 116 from the sixth network node 118.

Figure 10:
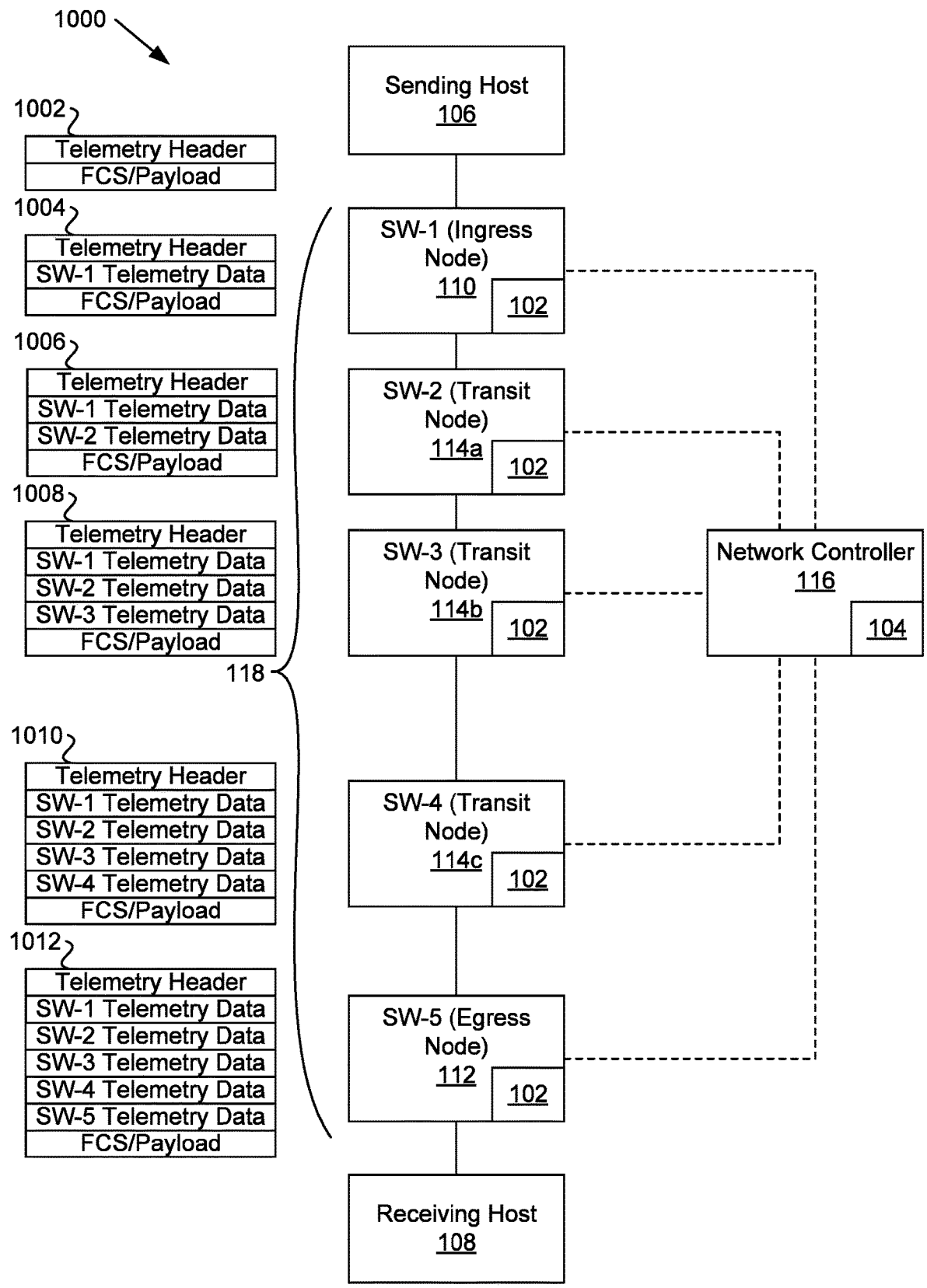
FIG. 10 is a schematic block diagram illustrating a portion of the data network of FIG. 1 displaying telemetry packets for each network node.

When a telemetry packet is at a particular network node 118, the telemetry packet includes telemetry data of each upstream network node 118 so that when each network node 118 transmits a received telemetry packet to the network controller 116, the network controller 116 receives redundant data, as depicted in FIG. 10. FIG. 10 is a schematic block diagram illustrating a portion of the data network of FIG. 1 and displaying a representation of telemetry packets for each network node 118. Redundant switches SW-6 120a and SW-7 120b are not depicted for clarity. In the embodiment, an initial telemetry packet 1002 is created in the sending host 106, network controller 116 or ingress node 110 that includes a telemetry header, a payload and a frame checksum ("FCS").

The ingress node 110 adds telemetry data and transforms the initial telemetry packet 1002 to a new telemetry packet 1004 in ingress node SW-1 110 that includes the SW-1 telemetry data as metadata, which is transmitted to transit node SW-2 114a. SW-2 114a adds telemetry data to create a telemetry packet 1006 that includes the telemetry header, SW-1 telemetry data, SW-2 telemetry data, a payload and FCS and the telemetry packet 1006 is transmitted to transit node SW-3 114b, which adds telemetry data creating a new telemetry packet 1008, which is then transmitted to transit node SW-4 114c. SW-3 114c again adds telemetry data creating a telemetry packet 1010, which is transmitted to the egress node SW-5 112, which adds telemetry data creating a telemetry packet 1012 that includes the telemetry packet header, SW-1 telemetry data, SW-2 telemetry data, SW-3 telemetry data, SW-4 telemetry data, SW-5 telemetry data, the payload and FCS. If every network node 118 sends the telemetry packets 1004, 1006, 1008, 1010, 1012 to the network controller 116, redundant telemetry data unnecessarily transmitted to the network controller 116. By having only the last network node 118 (i.e. egress node 112) in a communication pathway transmit a received telemetry packet to the network controller 116, this process reduces network traffic and processing time of the network nodes 118 and network controller 116.

Note that the telemetry apparatus 102 may also be implemented in other forms that substantially perform the same functions of the circuits 202, 204, 206, 208 of the telemetry apparatus 102. For example, the network node counter circuit 204 may determine a number of network nodes 118 that have contributed telemetry data to the telemetry packet prior to the telemetry data addition circuit 202 adding telemetry data to the telemetry packet and the network node threshold is then set to a number that is one less than the total network nodes 118 in the communication pathway. Other variations that accomplish limiting sending the telemetry packet from the egress node 112 to the network controller 116 without the other upstream network nodes 118 sending the telemetry packet to the network controller 116 are anticipated herein.

Figure 3:
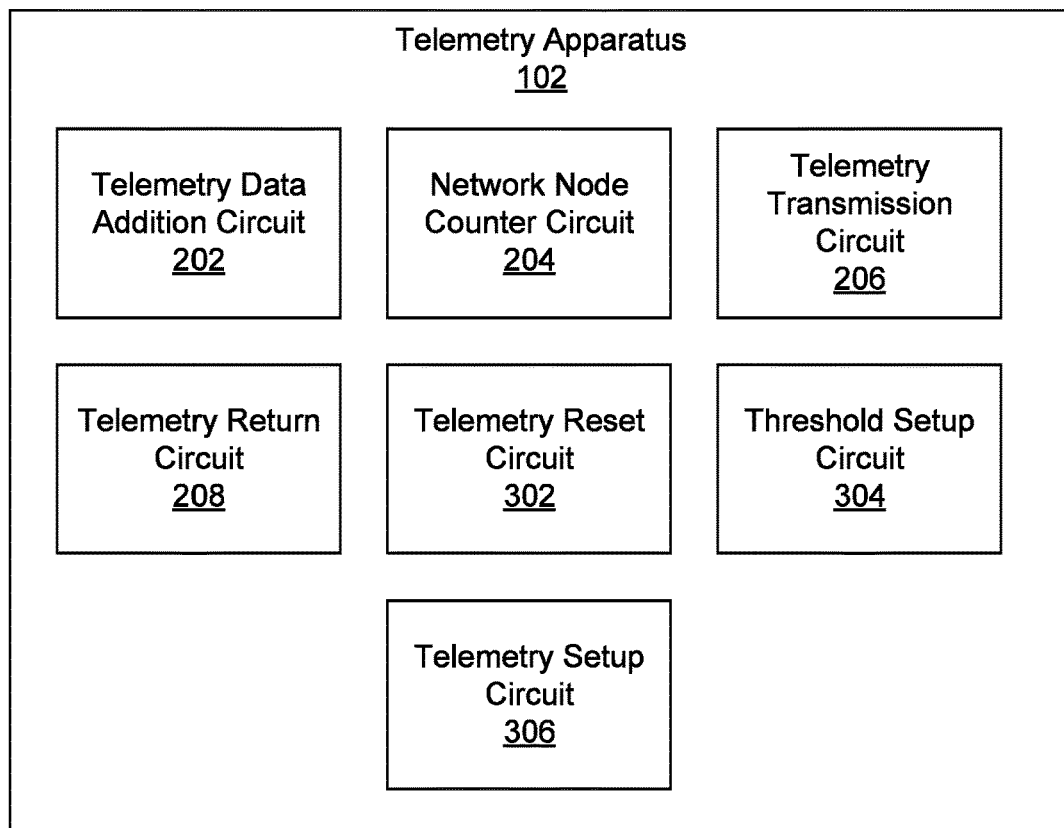
FIG. 3 is a schematic block diagram illustrating another embodiment of a telemetry apparatus for reducing unnecessary telemetry packet transmission to a network controller.

FIG. 3 is a schematic block diagram illustrating another embodiment 300 of a telemetry apparatus 102 for reducing unnecessary telemetry packet transmission to a network controller 116. The telemetry apparatus 102 includes a controller with a telemetry data addition circuit 202, a network node counter circuit 204, a telemetry transmission circuit 206 and a telemetry return circuit 208, which are substantially similar to those described above in relation to the embodiment 200 of the telemetry apparatus 102 of FIG. 2. In various embodiments, the controller also include a telemetry reset circuit 302, a threshold setup circuit 304 and/or a telemetry setup circuit 306, which are described in more detail below. The embodiment 300 of the telemetry apparatus 102 may be implemented with hardware circuits, a programmable hardware device and/or program code similar to the embodiment 200 of the telemetry apparatus 102 described above in relation to FIG. 2.

In some embodiments, the telemetry apparatus 102 includes a telemetry reset circuit 302 that resets the network node threshold to a default value in response to receiving a reset command from the network controller 116. The default value of the network node threshold is a value that causes each network node 118 in the communication pathway to transmit the telemetry packet to the network controller 116 in addition to transmitting the telemetry packet to the next destination along the communication pathway. For example, the default value may be one or zero. If the network node threshold is set to a value of one or zero, then the telemetry return circuit 208 in ingress node 110 and each network node 118 downstream of the ingress node 110 will determine that the number of network nodes 118 in the communication pathway that have added telemetry data to the telemetry packet is equal to or greater than the network node threshold of one or zero and will transmit the telemetry packet to the network controller 116.

For example, if the network controller 116 determines that telemetry packets are not being received or there is some other problem with the telemetry packets, the network controller 116, in some embodiments, transmits a reset command to each network node 118 and the network controller 116 is able to ascertain the number of network nodes 118 in a current communication pathway. In some instances, the number of network nodes 118 in the communication pathway may be reduced. For example, if the communication pathway includes six network nodes 118 and the network node threshold is set to six and a new communication pathway is set that includes five network nodes 118, the network controller 116 would not receive telemetry packets because the telemetry return circuit 208 in each of the five network nodes 118 would not transmit the telemetry packet to the network controller 116.

In some embodiments, the telemetry apparatus 102 includes a threshold setup circuit 304 that sets the network node threshold to a value equal to the number of network nodes 118 in the communication pathway in response to receiving a set threshold command from the network node where the set threshold command includes the number of network nodes in the communication pathway. For example, when the network nodes 118 in the communication pathway are first set up, the network node threshold may be set to a default value of one or zero so that all network nodes 118 in the communication pathway transmit telemetry packets to the network controller 116. The network controller 116 then is able to determine how many network nodes 118 and the identity of the network nodes 118 in the communication pathway.

For example, if the network controller 116 determines that there are six network nodes 118 in the communication pathway, the network controller 116 transmits a set threshold command to the network nodes 118 in the communication pathway with a network node threshold value of six and the threshold setup circuit 304 in each network node 118 in the communication pathway sets the network node threshold to six. In some embodiments, the network controller 116 determines the number of network nodes 118 in the communication pathway after a setup of telemetry packets where the network node threshold is set to the default value. In other embodiments, the communication pathway may be altered to add one or more additional network nodes 118 to the communication pathway and the network controller 116 is able to detect an increase in network nodes 118 in the communication pathway.

In some embodiments, the telemetry apparatus 102 includes a telemetry setup circuit 306 that, in response to receiving a telemetry setup command from the network controller 116, establishes the network node threshold for telemetry packets being transmitted along the communication pathway and sets the network node threshold to a default value, typically one or zero. With the network node threshold set to the default value, the telemetry return circuit 208 in each network node 118 in the communication pathway will transmit telemetry packets to the network controller 116. The network controller 116 is then able to determine the number of network nodes 118 in the communication pathway and to transmit a set threshold command with a network node threshold value equal to the number of network nodes 118 in the communication pathway.

Figure 4:
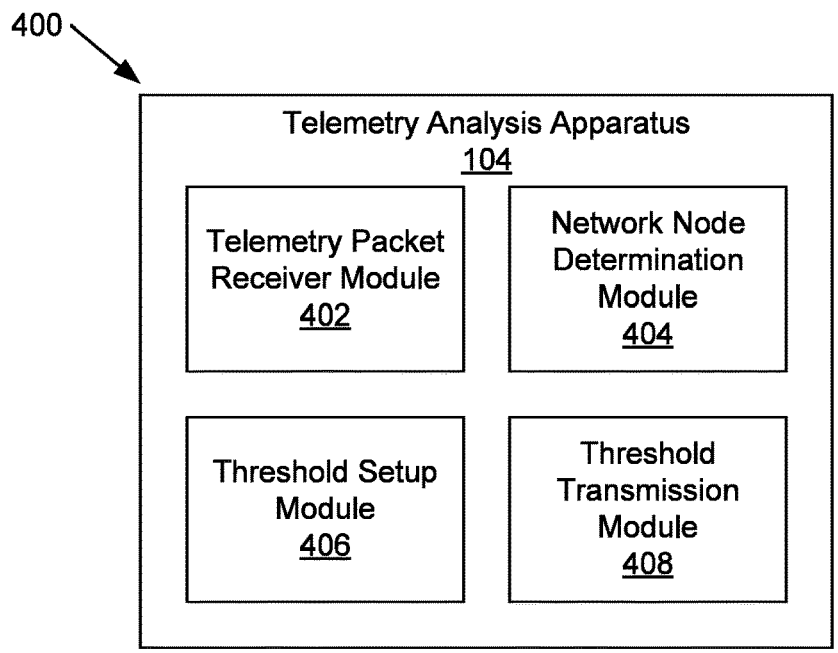
FIG. 4 is a schematic block diagram illustrating one embodiment of a telemetry analysis apparatus.

FIG. 4 is a schematic block diagram illustrating one embodiment 400 of a telemetry analysis apparatus 104. In the embodiment 400, the telemetry analysis apparatus 104 includes a telemetry packet receiver module 402, a network node determination module 404, a threshold setup module 406 and a threshold transmission module 408, which are described below. In some embodiments, the telemetry analysis apparatus 104 is implemented by program code stored on a computer readable storage media. The computer readable storage media may be non-volatile computer readable storage media. The computer readable storage media also may be volatile storage, and the volatile or non-volatile storage may be memory or other storage device accessible to a processor of the network controller 116. In other embodiments, all or a portion of the telemetry analysis apparatus 104 includes hardware circuits or a programmable hardware device.

The telemetry analysis apparatus 104 includes a telemetry packet receiver module 402 that receives, at the network controller 116, telemetry packets from network nodes 118 in a communication pathway of data packets being transmitted from a sending host 106 to a receiving host 108. The telemetry analysis apparatus 104 may receive telemetry packets from the egress node 112 or from other network nodes 118 in the communication pathway. The telemetry packet receiver module 402 receives the telemetry packets over a network, as described above in relation to the data network 100 of FIG. 1. The telemetry packet receiver module 402, in some embodiments, sets up the network nodes 118 in the communication pathway to generate and/or transmit telemetry packets.

The telemetry analysis apparatus 104 includes a network node determination module 404 that determines from the telemetry packets a number of network nodes 118 in the communication pathway. For example, the network node determination module 404 reads metadata in the header of a received telemetry packet to determine the number of network nodes 118 in the communication pathway by reading a counter, by determining how many telemetry data records are in the header, etc.

The telemetry analysis apparatus 104 includes a threshold setup module 406 that sets a network node threshold value equal to the determined number of network nodes 118 in the communication pathway and a threshold transmission module 408 that transmits, from the network controller 116, the network node threshold value to each network node 118 in the communication pathway. For example, the telemetry analysis apparatus 104 may be used to set the network node threshold value after an initial telemetry setup and some or all of the network nodes 118 in the communication pathway have sent telemetry packets to the network controller 116. The telemetry analysis apparatus 104 is then able to transmit a network node threshold value that will limit the network nodes 118 in the communication pathway so only the egress node 112 transmits telemetry packets.

Figure 5:
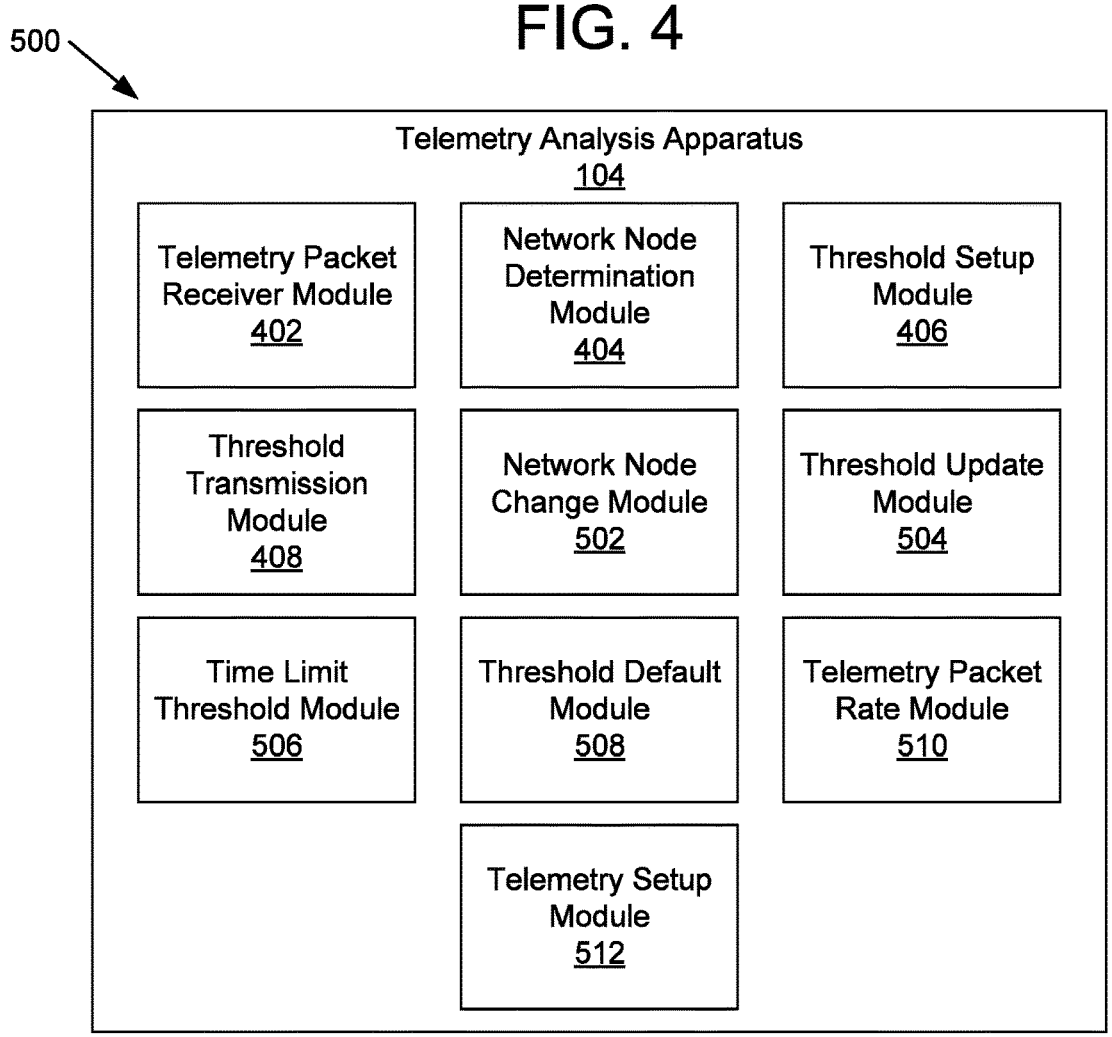
FIG. 5 is a schematic block diagram illustrating another embodiment of a telemetry analysis apparatus.

FIG. 5 is a schematic block diagram illustrating another embodiment 500 of a telemetry analysis apparatus 104. In the embodiment 500, the telemetry analysis apparatus 104 includes a telemetry packet receiver module 402, a network node determination module 404, a threshold setup module 406 and a threshold transmission module 408, which are substantially similar to those described above in relation to the embodiment 400 of the telemetry analysis apparatus 104 of FIG. 4. In various embodiments, the telemetry analysis apparatus 104 includes a network node change module 502, a threshold update module 504, a time limit threshold module 506, a threshold default module 508, a telemetry packet rate module 510 and/or a telemetry setup module 512, which are described below. In some embodiments, the telemetry analysis apparatus 104 is implemented in a similar way to the telemetry analysis apparatus 104 of FIG. 4.

The telemetry analysis apparatus 104, in some embodiments, includes a network node change module 502 and a threshold update module 504 that update the network node threshold value. For example, after the threshold transmission module 408 transmits a network node threshold value equal to the number of network nodes 118 in the communication pathway and the communication pathway changes to add one or more additional network nodes 118 to the communication pathway, the telemetry packet receiver module 402 may receive additional telemetry packets and the network node change module 502 then determines from the received telemetry packets that the number of network nodes 118 in the communication pathway is greater than the transmitted network node threshold value. In some embodiments, the telemetry packet receiver module 402 receives the additional telemetry packets that indicate a change in the communication pathway after a delay time for the transmitted network threshold value to take effect in the network nodes 118. For example, the delay time includes a time equal to or longer than a time for transmitting the updated network node threshold value to each network node 118 in the communication pathway plus a time for each network node 118 to change the network node threshold value.

The threshold update module 504 then updates the network node threshold value to a new number of network nodes 118 in the communication pathway and the threshold transmission module 408 transmits the updated network node threshold value to each network node 118 in the communication pathway so that only the egress node 112 transmits telemetry packets to the network controller 116. In some embodiments, the network node determination module 404 determines from the received telemetry packets that the number of network nodes 118 in the communication pathway is greater than the transmitted network node threshold value and the threshold setup module 406 updates the network node threshold value to a new number of network nodes 118 in the communication pathway.

In some embodiments, the telemetry analysis apparatus 104 includes a time limit threshold module 506 that, in response to previously transmitting the network node threshold value to the network nodes 118 in the communication pathway so that telemetry data packets are transmitted along the communication pathway, reaches a telemetry packet time limit from a time that a previous telemetry packet was received by the network controller 116. For example, the communication pathway may be modified to reduce the number of network nodes 118 in the communication pathway, in which case the number of network nodes 118 is less than the network node threshold value stored in the network nodes 118 and the egress node 112 will not transmit the telemetry packet to the network controller 116.

The time limit threshold module 506, in some embodiments, starts a timer after each telemetry packet is received and if the time limit threshold module 506 determines that the timer has reached the telemetry packet time limit, the threshold default module 508 transmits a network node threshold value equal to the default value, which may be one or zero or a lower number, to each network node in the communication pathway. For example, the threshold default module 508 may transmit a reset command to each network node 118 in the communication pathway. The network nodes 118 in the communication pathway then start transmitting telemetry packets to the network controller 116 and the network node determination module 404 may then determine the new number of network nodes 118 in the new communication pathway and the threshold setup module 406 then sets the network node threshold value to the new number of network nodes 118 and the threshold transmission module 408 transmits out the updated network node threshold value.

In other embodiments, the telemetry packet receiver module 402 may not receive telemetry packets for other reasons and the telemetry analysis apparatus 104 may first use the threshold default module 508 to reset the network node thresholds of the network nodes 118 in the communication pathway before taking other action to determine why telemetry packets are not being received by the network controller 116.

In some embodiments, the telemetry analysis apparatus 104 includes a telemetry packet rate module 510 that determines a telemetry packet rate and sets the telemetry packet time limit. The telemetry packet rate, in some embodiments, is an average time between receiving, at the network controller 116, telemetry packets for the communication pathway. The telemetry packet time limit, in some embodiments, includes the average time between receiving telemetry packets in addition to an acceptable delay time. For example, if the telemetry packet rate module 510 determines that the telemetry packet rate is a telemetry packet every two seconds, the telemetry packet rate module 510 may add two seconds, four second or longer to the two second average telemetry packet rate to set the telemetry packet time limit. In some embodiments, the telemetry packet time limit is set to a value that accounts for slow network traffic. One of skill in the art will recognize other ways to determine a telemetry packet time limit.

In some embodiments, the telemetry analysis apparatus 104 includes a telemetry setup module 512 that transmits a telemetry setup command to each network node 118 in a network. Typically, the telemetry setup command includes at least identifying information for the sending host 106 and the receiving host 108. In some embodiments, the telemetry setup command includes a network node threshold value equal to the default value. The telemetry setup command may also include other information used by the sending host 106 and/or network nodes 118 in the network to set up transmitting telemetry packets along the communication pathway. In other embodiments, at least the sending host 106 and/or the ingress node 110 include a capability to discover the communication pathway and to generate and transmit telemetry packets along the communication pathway.

In some embodiments, each network node 118 in the communication pathway, in response to receiving the telemetry setup command, sets a network node threshold to a default value (which may or may not have been included in the telemetry setup command), adds telemetry data to a telemetry packet, transmits the telemetry packet to a next destination in the communication pathway, and transmits the telemetry packet to the network controller 116. One of skill in the art will recognize other information in a telemetry setup command.

Figure 6:
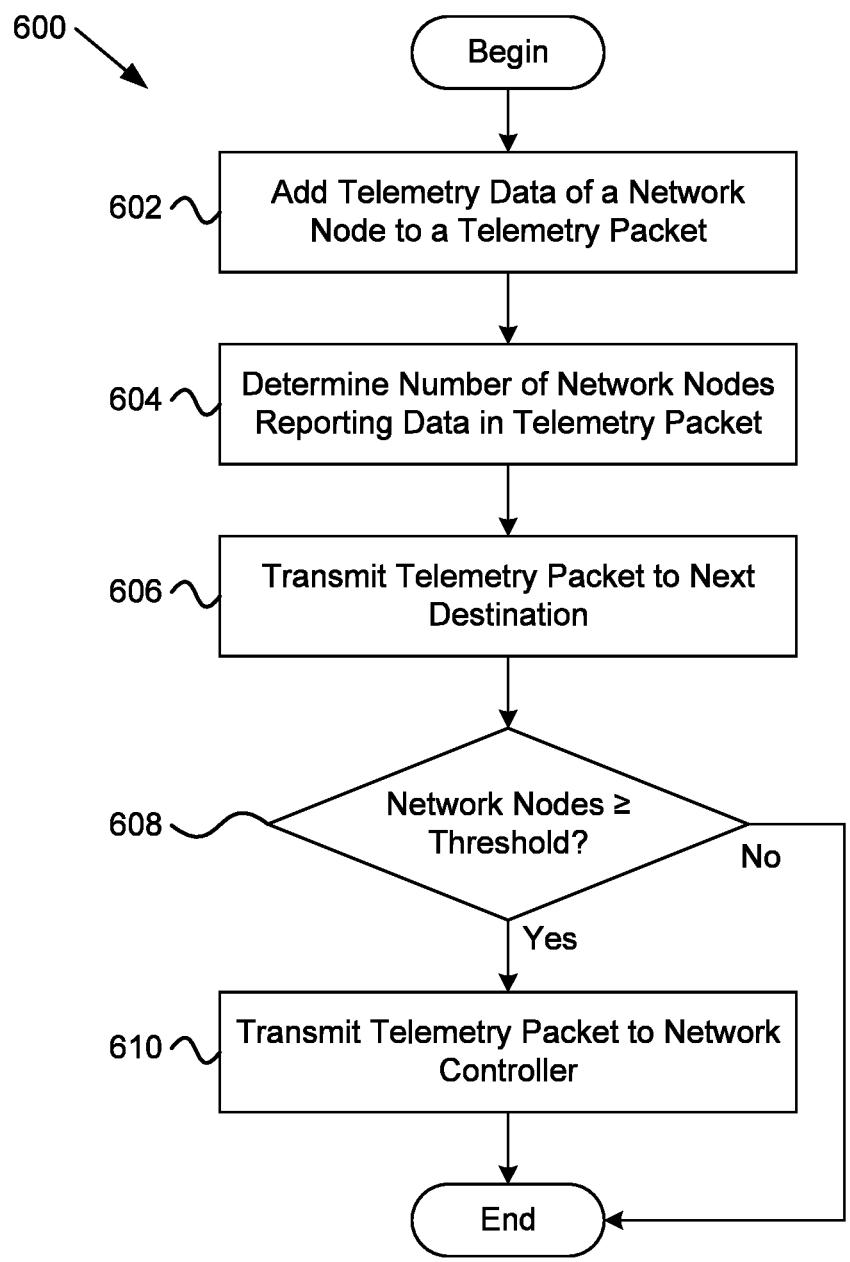
FIG. 6 is a schematic flow chart diagram illustrating one embodiment of a method for reducing unnecessary telemetry packet transmission to a network controller.

FIG. 6 is a schematic flow chart diagram illustrating one embodiment of a method 600 for reducing unnecessary telemetry packet transmission to a network controller 116. The method 600 begins and adds 602 telemetry data to a telemetry packet at a network node 118 of a communication pathway. The telemetry packet is transmitted along network nodes 118 of the communication pathway for data packets being transmitted from a sending host 106 to a receiving host 108. Telemetry data includes latency data of the network node 118. The method 600 includes determining 604, from the telemetry packet, a number of network nodes 118 in the communication pathway that have added telemetry data to the telemetry packet. For example, if the network node 118 where the telemetry packet is currently residing is a second network node 118 in the communication pathway, the method 600 determines 604 that the number of network nodes 118 is two.

The method 600 transmits 606 the telemetry packet to a next destination along the communication pathway and determines 608 if the number of network nodes 118 in the communication pathway that have added telemetry data to the telemetry packet is equal to or greater than a network node threshold. If the method 600 determines 608 that the number of network nodes 118 in the communication pathway that have added telemetry data to the telemetry packet is equal to or greater than a network node threshold, the method 600 transmits 610 the telemetry packet to the network controller 116, and the method 600 ends. If the method 600 determines 608 that the number of network nodes 118 in the communication pathway that have added telemetry data to the telemetry packet is not equal to or greater than a network node threshold, the method 600 ends without sending the telemetry packet to the network controller 116. In various embodiments, the method 600 is implemented by a telemetry data addition circuit 202, a network node counter circuit 204, a telemetry transmission circuit 206 and/or a telemetry return circuit 208.

Figure 7:
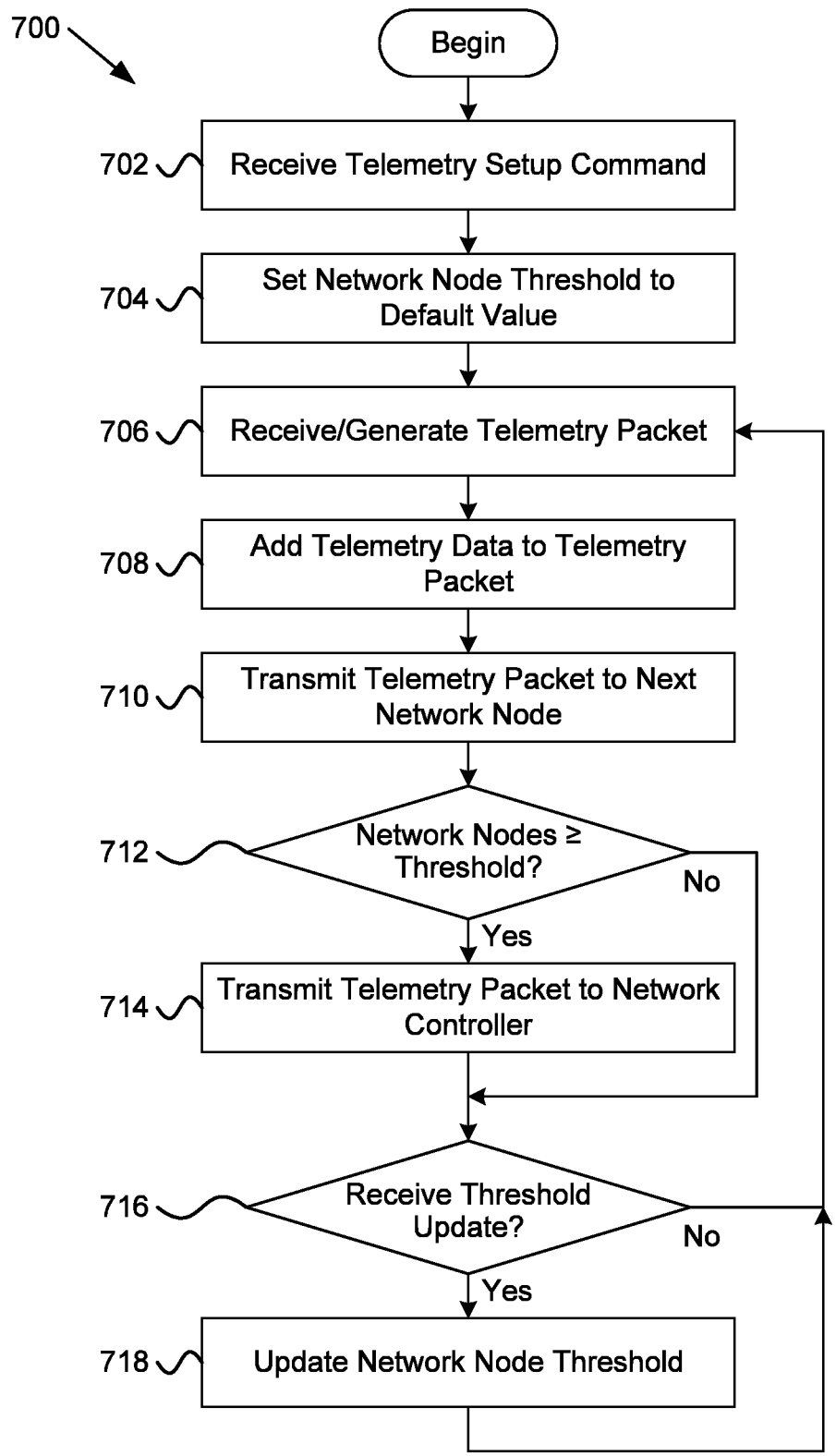
FIG. 7 is a schematic flow chart diagram illustrating another embodiment of a method for reducing unnecessary telemetry packet transmission to a network controller.

FIG. 7 is a schematic flow chart diagram illustrating another embodiment of a method 700 for reducing unnecessary telemetry packet transmission to a network controller 116. The method 700 begins and receives 702, at a network node 118 in a communication pathway for data packets sent from a sending host 106 to a receiving host 108, a telemetry setup command from a network controller 116 and sets 704 a network node threshold to a default value. The default value is a value that causes each network node 118 in the communication pathway to send telemetry packets to the network controller 116.

In some embodiments, the method 700 receives 706 a telemetry packet from an upstream network node 118 or possibly from the sending host 106 in cases where the sending host 106 generates telemetry packets. In other embodiments, the method 700 generates 706 a telemetry packet where the network node 118 is an ingress node 110 and telemetry packets are generated at the ingress node 110. In some examples, the method 700 generates 706 the telemetry packet in response to the telemetry setup command from the network controller 116.

The method 700 adds 708 telemetry data to the telemetry packet. The telemetry data includes latency data regarding data packets being received, processed, and transmitted in the network node 118. The telemetry data, in some embodiments, includes an identifier of the network node 118 adding 708 the telemetry data to the telemetry packet. The method 700 transmits 710 the telemetry packet to a next network node 118 in the communication pathway.

The method 700 determines 712 if a number of network nodes 118 that have added telemetry data to the telemetry packet is equal to or greater than the network node threshold. If the method 700 determines 712 that the number of network nodes 118 that have added telemetry data to the telemetry packet is equal to or greater than the network node threshold, the method 700 transmits 714 the telemetry packet to the network controller 116. If the method 700 determines 712 that the number of network nodes 118 that have added telemetry data to the telemetry packet is less than the network node threshold, the method 700 does not transmit the telemetry packet to the network controller 116 and drops the telemetry packet.

The method 700 determines 716 if an update to the network node threshold has been received from the network controller 116. If the method 700 determines 716 that an update to the network node threshold has been received from the network controller 116, the method 700 updates 718 the network node threshold and returns and receives/generates 706 a next telemetry packet. For example, an update of the network node threshold may be an increase to the network node threshold where the communication pathway has been modified to include additional network nodes 118. In another example, an update to the network node threshold may be to decrease the network node threshold to a default value. If the method 700 determines 716 that an update to the network node threshold has not been received from the network controller 116, the method 700 returns and receives/generates 706 a next telemetry packet. In various embodiments, all or a portion of the method 700 may be implemented by a telemetry data addition circuit 202, a network node counter circuit 204, a telemetry transmission circuit 206, a telemetry return circuit 208, a telemetry reset circuit 302, a threshold setup circuit 304 and/or a telemetry setup circuit 306.

Figure 8:
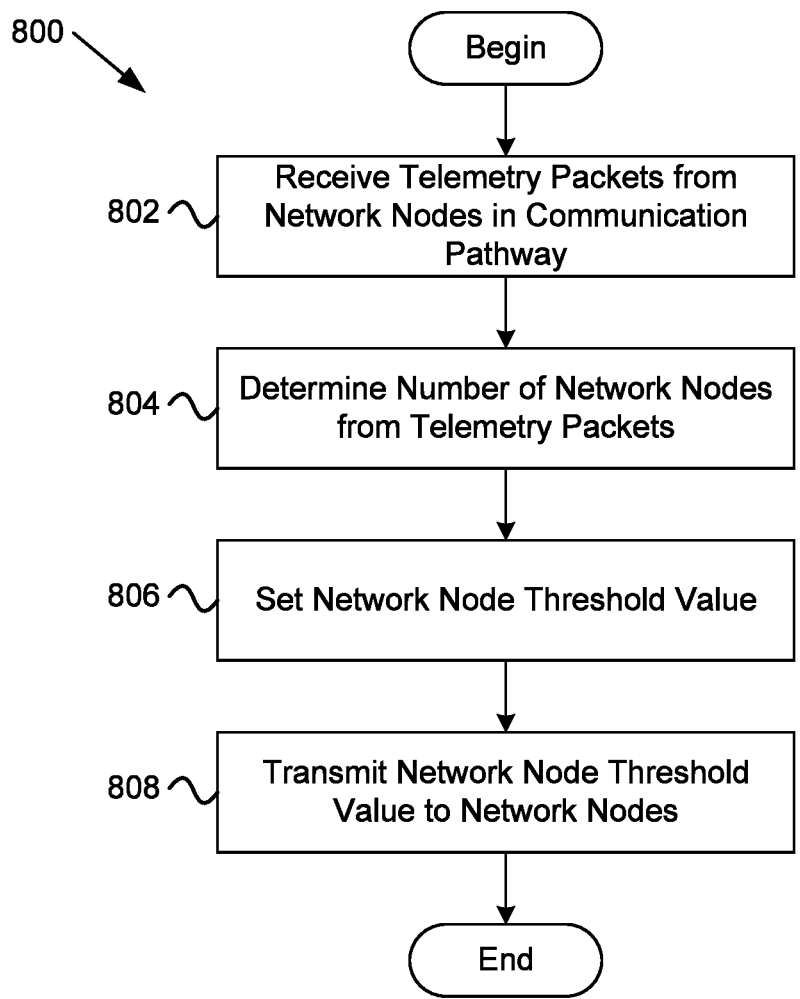
FIG. 8 is a schematic flow chart diagram illustrating one embodiment of a method for adjusting a network node threshold value and transmitting the value to network nodes.

FIG. 8 is a schematic flow chart diagram illustrating one embodiment of a method 800 for adjusting a network node threshold value and transmitting the value to network nodes 118. The method 800 begins and receives 802, at a network controller 116, telemetry packets from network nodes 118 in a communication pathway of data packets being transmitted from a sending host 106 to a receiving host 108. The method 800 determines 804 from the telemetry packets a number of network nodes 118 in the communication pathway. For example, a network node threshold in each network node 118 may be set to a default value and the method 800 is in a discovery mode to determine 804 from the received telemetry packets the number of network nodes 118 in the communication pathway. In other embodiments, the number of network nodes 118 in the communication pathway may have changed.

The method 800 sets 806 the network node threshold value equal to the determined number of network nodes 118 in the communication pathway and transmits 808, from the network controller 116, the network node threshold value to each network node 118 in the communication pathway, and the method 800 ends. For example, if the method 800 determines 804 that there are five network nodes 118 in the communication pathway, the method 800 sets 806 the network node threshold value to five and transmits 808 the network node threshold value of five to the network nodes 118 in the communication pathway. In various embodiments, all or a portion of the method 800 is implemented by a telemetry packet receiver module 402, a network node determination module 404, a threshold setup module 406 and/or a threshold transmission module 408.

Figure 9:
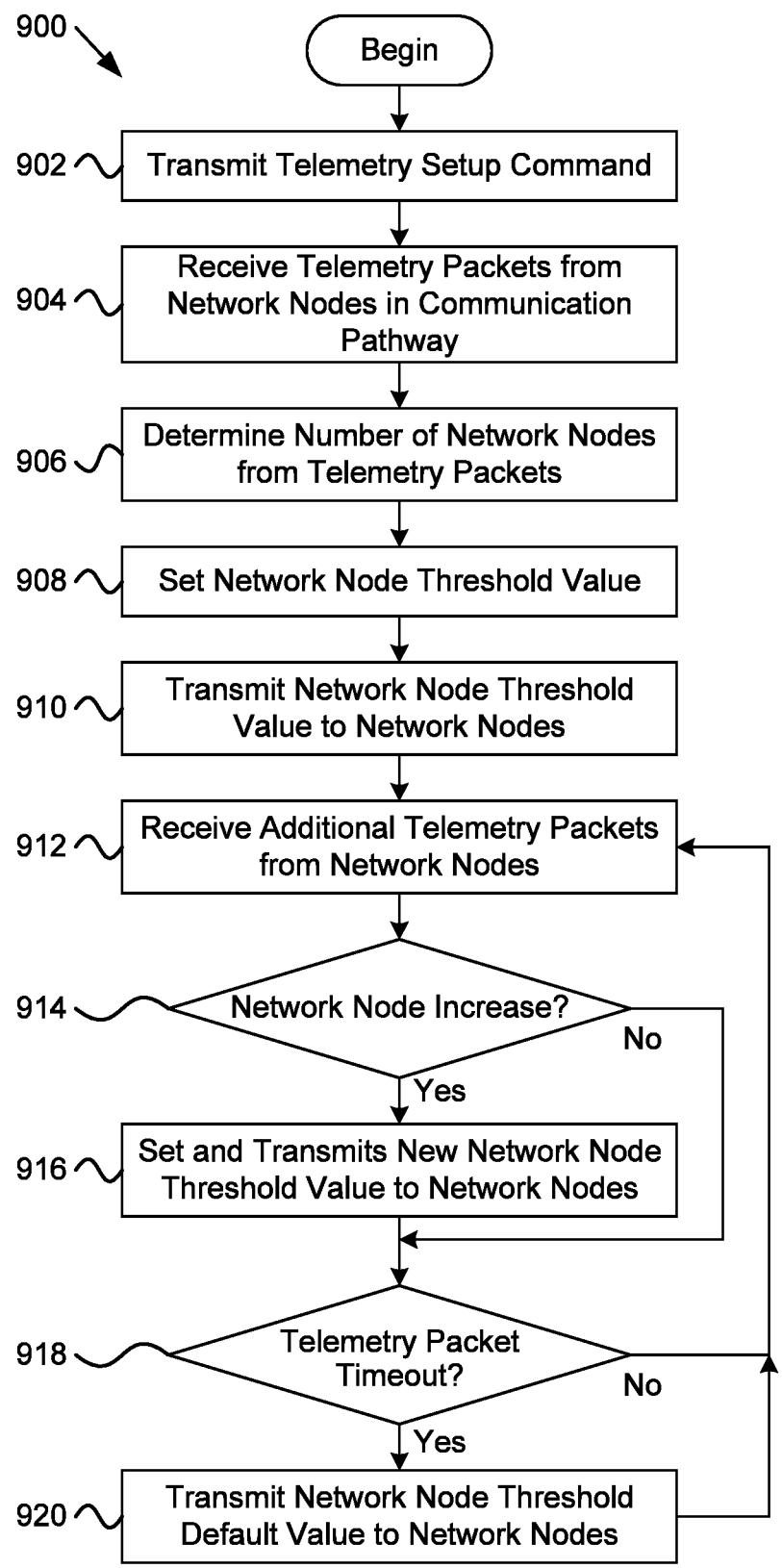
FIG. 9 is a schematic flow chart diagram illustrating another embodiment of a method for adjusting a network node threshold value and transmitting the value to network nodes.

FIG. 9 is a schematic flow chart diagram illustrating another embodiment of a method 900 for adjusting a network node threshold value and transmitting the value to network nodes 118. The method 900 begins and transmits 902 a telemetry setup command to each network node 118 in a network. The telemetry setup command includes at least identifying information for the sending host 106 and the receiving host 108. In some embodiments, the telemetry setup command includes a network node threshold value set to a default value. In other embodiments, the network nodes 118 establish a network node threshold set to a default value. The telemetry setup command, in some embodiments, initiates generation of a telemetry packet and/or MAC address discovery to determine the network nodes 118 in the communication pathway.

The method 900 receives 904 telemetry packets, at the network controller 116, telemetry packets from network nodes 118 in a communication pathway of data packets being transmitted from a sending host 106 to a receiving host 108 and determines 906 from the telemetry packets a number of network nodes 118 in the communication pathway. The method 900 sets 908 the network node threshold value equal to the determined number of network nodes 118 in the communication pathway and transmits 910, from the network controller 116, the network node threshold value to each network node 118 in the communication pathway.

The method 900 receives 912 additional telemetry packets and determines 914 if the number of network nodes 118 in the communication pathway has increased. If the method 900 determines 914 that the number of network nodes 118 in the communication pathway has increased, the method 900 sets 916 a new network node threshold value equal to the new number of network nodes 118 in the communication pathway and transmits 916 the new network node threshold value to the network nodes 118 in the communication pathway. If the method 900 determines 914 that the number of network nodes 118 in the communication pathway has not increased, the method 900 does not change the network node threshold value.

The method 900 determines 918 if there is a telemetry packet timeout. The telemetry packet timeout is measured from a time that the network controller 116 last received a telemetry packet. If the time from when a last telemetry packet was received reaches a telemetry packet time limit, the method 900 determines 918 that there is a telemetry packet timeout and the method 900 transmits 920 a network node threshold value that is the default value to the network nodes 118 of the communication pathway, and the method 900 returns and receives 912 additional telemetry packets. If the method 900 determines 918 that there has not been a telemetry packet timeout, the method 900 returns and receives 912 additional telemetry packets. In various embodiments, all or a portion of the method 900 is implemented by a telemetry packet receiver module 402, a network node determination module 404, a threshold setup module 406, a threshold transmission module 408, a network node change module 502, a threshold update module 504, a time limit threshold module 506, a threshold default module 508, a telemetry packet rate module 510 and/or a telemetry setup module 512.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
 a network node comprising a controller, the controller configured to
  add telemetry data to a telemetry packet, the telemetry packet being transmitted along a communication pathway for data packets being transmitted from a sending host to a receiving host;
  determine, from the telemetry packet, a number of network nodes in the communication pathway that have added telemetry data to the telemetry packet;

transmit the telemetry packet to a next destination along the communication pathway and to a network controller in response to determining that the number of network nodes in the communication pathway that have added telemetry data to the telemetry packet is equal to or greater than a network node threshold; and transmit the telemetry packet to the next destination along the communication pathway without transmitting the telemetry packet to the network controller in response to determining that the number of network nodes in the communication pathway that have added telemetry data to the telemetry packet is less than the network node threshold.

2. The apparatus of claim 1, wherein the controller is further configured to reset the network node threshold to a default value in response to receiving a reset command from the network controller.

3. The apparatus of claim 2, wherein the default value of the network node threshold is a value that causes each network node in the communication pathway to transmit the telemetry packet to the network controller in addition to transmitting the telemetry packet to the next destination along the communication pathway.

4. The apparatus of claim 2, wherein the default value of the network node threshold is one or less.

5. The apparatus of claim 1, wherein the controller is further configured to set the network node threshold to a value equal to a number of network nodes in the communication pathway in response to receiving a set threshold command from the network node, the set threshold command comprising the number of network nodes in the communication pathway.

6. The apparatus of claim 1, wherein the controller is further configured to, in response to receiving a telemetry setup command from the network controller, establish the network node threshold for telemetry packets being transmitted along the communication pathway and to set the network node threshold to a default value, wherein the default value of the network node threshold is a value that causes each network node to transmit the telemetry packet to the network controller in addition to transmitting the telemetry packet to the next destination along the communication pathway.

7. The apparatus of claim 1, wherein the communication pathway comprises network nodes that transmit data packets and telemetry packets on a data link layer.

8. The apparatus of claim 1, wherein the communication pathway comprises network nodes in a same network.

9. The apparatus of claim 1, wherein the telemetry data comprises latency data of data packets being processed by the network node.

10. The apparatus of claim 1, wherein the controller is further configured to determine the next destination along the communication pathway based on destination Media Access Control ("MAC") lookup.

11. A method comprising:
adding, at a controller of a network node, telemetry data to a telemetry packet, the telemetry packet being transmitted along a communication pathway for data packets being transmitted from a sending host to a receiving host;
determining, at the controller, from the telemetry packet, a number of network nodes in the communication pathway that have added telemetry data to the telemetry packet;
transmitting, at the controller, the telemetry packet to a next destination along the communication pathway and to a network controller in response to determining that the number of network nodes in the communication pathway that have added telemetry data to the telemetry packet is equal to or greater than a network node threshold; and
transmitting, at the controller, the telemetry packet to the next destination along the communication pathway without transmitting the telemetry packet to the network controller in response to determining that the number of network nodes in the communication pathway that have added telemetry data to the telemetry packet is less than the network node threshold.

12. The method of claim 11, further comprising resetting, at the controller, the network node threshold to a default value in response to receiving a reset command from the network controller.

13. The method of claim 12, wherein the default value of the network node threshold is a value that causes each network node in the communication pathway to transmit the telemetry packet to the network controller in addition to transmitting the telemetry packet to the next destination along the communication pathway.

14. The method of claim 11, further comprising setting, at the controller, the network node threshold to a value equal to a number of network nodes in the communication pathway in response to receiving a set threshold command from the network node, the set threshold command comprising the number of network nodes in the communication pathway.

15. The method of claim 11, further comprising, in response to receiving a telemetry setup command from the network controller, establishing the network node threshold for telemetry packets being transmitted along the communication pathway and setting the network node threshold to a default value, wherein the default value of the network node threshold is a value that causes each network node to transmit the telemetry packet to the network controller in addition to transmitting the telemetry packet to the next destination along the communication pathway.

16. The method of claim 11, wherein the communication pathway comprises network nodes that transmit data packets and telemetry packets on a data link layer and wherein the communication pathway comprises network nodes in a same network.

17. A program product comprising a non-transitory computer readable storage medium with program code, the program code being configured to be executable by a processor to perform operations comprising:
adding, at a controller of a network node, telemetry data to a telemetry packet, the telemetry packet being transmitted along a communication pathway for data packets being transmitted from a sending host to a receiving host;
determining, at the controller, from the telemetry packet, a number of network nodes in the communication pathway that have added telemetry data to the telemetry packet;
transmitting, at the controller, the telemetry packet to a next destination along the communication pathway and to a network controller in response to determining that the number of network nodes in the communication pathway that have added telemetry data to the telemetry packet is equal to or greater than a network node threshold; and transmitting, at the controller, the telemetry packet to the next destination along the communication pathway without transmitting the telemetry packet to the network controller in response to determining that the number of network nodes in the communication pathway that have added telemetry data to the telemetry packet is less than the network node threshold.

18. The program product of claim 17, the program code being further configured to be executable by a processor to perform operations comprising resetting, at the controller, the network node threshold to a default value in response to receiving a reset command from the network controller.

19. The program product of claim 18, wherein the default value of the network node threshold is a value that causes each network node in the communication pathway to transmit the telemetry packet to the network controller in addition to transmitting the telemetry packet to the next destination along the communication pathway.

20. The program product of claim 17, the program code being further configured to be executable by a processor to perform operations comprising, in response to receiving a telemetry setup command from the network controller, establishing the network node threshold for telemetry packets being transmitted along the communication pathway and setting the network node threshold to a default value, wherein the default value of the network node threshold is a value that causes each network node to transmit the telemetry packet to the network controller in addition to transmitting the telemetry packet to the next destination along the communication pathway.

\* \* \* \* \*